(12) United States Patent
Zafar et al.

(10) Patent No.: US 12,286,565 B2
(45) Date of Patent: Apr. 29, 2025

(54) PROCESS FOR PREPARING A BONDING RESIN

(71) Applicant: Stora Enso OYJ, Helsinki (FI)

(72) Inventors: Ashar Zafar, Älta (SE); Jesper Ekström, Johanneshov (SE)

(73) Assignee: Stora Enso OYJ, Helsinki (FI)

( * ) Notice: Subject to any disclaimer, the term of this patent is extended or adjusted under 35 U.S.C. 154(b) by 384 days.

(21) Appl. No.: 17/622,368

(22) PCT Filed: Jun. 22, 2020

(86) PCT No.: PCT/IB2020/055857
§ 371 (c)(1),
(2) Date: Dec. 23, 2021

(87) PCT Pub. No.: WO2020/261087
PCT Pub. Date: Dec. 30, 2020

(65) Prior Publication Data
US 2022/0243105 A1    Aug. 4, 2022

(30) Foreign Application Priority Data

Jun. 24, 2019    (SE) .................................... 1950773-0

(51) Int. Cl.
| | | |
|---|---|---|
| C09J 171/00 | (2006.01) | |
| B32B 7/12 | (2006.01) | |
| B32B 21/04 | (2006.01) | |
| B32B 21/13 | (2006.01) | |
| B32B 21/14 | (2006.01) | |
| C09J 197/00 | (2006.01) | |

(52) U.S. Cl.
CPC .............. *C09J 171/00* (2013.01); *B32B 7/12* (2013.01); *B32B 21/042* (2013.01); *B32B 21/13* (2013.01); *B32B 21/14* (2013.01); *C09J 197/005* (2013.01); *B32B 2255/08* (2013.01); *B32B 2255/26* (2013.01); *B32B 2419/00* (2013.01)

(58) Field of Classification Search
CPC ....................... C09J 171/00; C09J 197/005
See application file for complete search history.

(56) References Cited

U.S. PATENT DOCUMENTS

| | | |
|---|---|---|
| 4,918,167 A | 4/1990 | Glasser et al. |
| 7,722,712 B2 | 5/2010 | Li |
| 10,858,554 B2 | 12/2020 | Feng et al. |
| 2004/0089418 A1 | 5/2004 | Li |
| 2007/0249504 A1 | 10/2007 | Ballard |
| 2012/0329100 A1* | 12/2012 | Uraki .................. C12P 7/10 435/162 |
| 2015/0175882 A1 | 6/2015 | Passauer et al. |
| 2015/0329753 A1 | 11/2015 | Billington et al. |
| 2015/0344737 A1 | 12/2015 | Bode et al. |
| 2016/0304757 A1 | 10/2016 | Feng et al. |

FOREIGN PATENT DOCUMENTS

| | | | | |
|---|---|---|---|---|
| CA | 654728 A | * | 12/1962 | |
| CL | 200500130 | | 7/2005 | |
| CL | 201702577 | | 4/2018 | |
| CL | 202003134 | | 5/2021 | |
| CN | 106497149 A | * | 3/2017 | ............ B82Y 30/00 |
| CN | 107532060 A | | 1/2018 | |
| CN | 108192547 A | | 6/2018 | |
| EP | 1740670 A1 | | 1/2007 | |
| JP | 2011116930 A | | 6/2011 | |
| JP | 2018104688 A | | 7/2018 | |
| SE | 1850830 A1 | | 1/2020 | |
| WO | 2005113700 A1 | | 12/2005 | |
| WO | 2006031175 A1 | | 3/2006 | |
| WO | 2020008311 A1 | | 1/2020 | |

OTHER PUBLICATIONS

Standard Operating Procedure of Sodium Hydroxide by UC (Year: 2012).*
International Search report from corresponding PCT application No. PCT/IB2020/055857 mailed Nov. 9, 2020.
Guo-Hua Delmas et al., BioligninTM Based Epoxy Resins, Journal of Applied Polymer Science, 2013, DOI:10.1002/APP.37921, pp. 1863-1872.
Engelmann, Gunnar et al., Bio-based epoxy resins with low molecular weight kraft lignin and pyrogallol, Holzforschung 2014; 68(4): 435-446.
Li, Russell Jingxian et al., A lignin-epoxy resin derived from biomass as an alternative to formaldehyde-based wood adhesvies, Green Chemistry, DOI: 10.1039/c7gc03026f.
Guo-Hua Delmas et al., BioligninTM Based Epoxy Resins, Journal of Applied Polymer Science, 2013, 1863-1872.

* cited by examiner

*Primary Examiner* — Mark S Kaucher
(74) *Attorney, Agent, or Firm* — Greer, Burns & Crain, Ltd.

(57) ABSTRACT

The present invention relates to a process for preparing a bonding resin, lignin in solid form or in the form of a dispersion in water is mixed with a crosslinker; and optionally one or more additives followed by addition of a basic solution. The bonding resin is useful for example in the manufacture of laminates, mineral wool insulation and wood products such as plywood, oriented strandboard (OSB), laminated veneer lumber (LVL), medium density fiberboards (MDF), high density fiberboards (HDF), parquet flooring, curved plywood, veneered particleboards, veneered MDF or particle boards, laminates or mineral wool insulation.

9 Claims, No Drawings

PROCESS FOR PREPARING A BONDING RESIN

This application is a U.S. National Phase under 35 U.S.C. § 371 of International Application No. PCT/IB2020/055857, filed Jun. 22, 2020, which claims priority under 35 U.S.C. §§ 119 and 365 to Swedish Application No. 1950773-0 filed Jun. 24, 2019.

FIELD OF THE INVENTION

The present invention relates to a process for preparing a bonding resin, wherein lignin is provided in solid form or in the form of a dispersion in water and mixed with one or more of glycerol diglycidyl ether, diglycerol polyglycidyl ether, polyglycerol polyglycidyl ether, glycerol triglycidyl ether, sorbitol polyglycidyl ether, alkoxylated glycerol polyglycidyl ether, trimethylolpropane triglycidyl ether, trimethylolpropane diglycidyl ether, polyoxypropylene glycol diglycidylether, polyoxypropylene glycol triglycidyl ether, diglycidylether of cyclohexane dimethanol, resorcinol diglycidyl ether, isosorbide diglycidyl ether, pentaerythritol tetraglycidyl ether, ethylene glycol diglycidyl ether, polyethylene glycol diglycidyl ether having 2-9 ethylene glycol units, propylene glycol diglycidyl ether having 1-5 propylene glycol units, hexahydrophtalic acid diglycidylester and/or diglycidyl ether of terminal diol having a linear carbon chain of 3-6 carbon atoms, or a crosslinker selected from diglycidyl-, triglycidyl- or polyglycidyl-ether of a carbohydrate, diglycidyl-, triglycidyl- or polyglycidyl-ester of a carbohydrate, diglycidyl-ether or diglycidyl ester of salicylic acid, vanillic acid, or 4-hydroxybenzoic acid, an epoxidized or glycidyl substituted plant-based phenolic compound (such as tannin, cardanol, cardol, anacardic acid) or epoxidized plant-based oil (such as rapeseed oil, linseed oil, soy bean oil), tris(4-hydroxyphenyl) methane triglycidyl ether, N,N-bis(2,3-epoxypropyl)aniline, p-(2,3-epoxypropoxy-N, N-bis(2,3-epoxypropyl)aniline, diglycidyl ether of bis-hydroxymethylfuran, and a crosslinker having functional groups selected from diglycidyl amide, triglycidyl amide, polyglycidyl amide, diglycidyl ester, triglycidyl ester, polyglycidyl ester, diglycidyl azide, triglycidyl azide, polyglycidyl azide, diglycidyl methacrylate, triglycidyl methacrylate and polyglycidyl methacrylate and optionally one or more additives, followed by addition of a basic solution. The bonding resin is useful for example in the manufacture of laminates, mineral wool insulation and wood products such as plywood, oriented strandboard (OSB), laminated veneer lumber (LVL), medium density fiberboards (MDF), high density fiberboards (HDF), parquet flooring, curved plywood, veneered particleboards, veneered MDF, laminates or mineral wool insulation. The bonding resin is also useful for example in composites, molding compounds, foundry applications and coatings for paper, wood or metal substrates.

BACKGROUND

Lignin, an aromatic polymer is a major constituent in e.g. wood, being the most abundant carbon source on Earth second only to cellulose. In recent years, with development and commercialization of technologies to extract lignin in a highly purified, solid and particularized form from the pulp-making process, it has attracted significant attention as a possible renewable substitute to primarily aromatic chemical precursors currently sourced from the petrochemical industry.

Lignin, being a polyaromatic network has been extensively investigated as a suitable substitute for phenol during production of phenol-formaldehyde adhesives. These are used during manufacturing of laminate and structural wood products such as plywood, oriented strand board and fiberboard. During synthesis of such adhesives, phenol, which may be partially replaced by lignin, is reacted with formaldehyde in the presence of either basic or acidic catalyst to form highly cross-linked aromatic resins termed novolacs (when utilizing acidic catalysts) or resoles (when utilizing basic catalysts). Currently, only limited amounts of the phenol can be replaced by lignin due to the lower reactivity of lignin.

One problem when preparing resins comprising lignin is the use of formaldehyde, when the lignin is used in formaldehyde-containing resins, such as lignin-phenol-formaldehyde resins. Formaldehyde based resins emit formaldehyde, which is a toxic volatile organic compound. The present and proposed legislation directed to the lowering or elimination of formaldehyde emissions have led to the development of formaldehyde free resin for wood adhesive applications.

Jingxian Li R. et al. (Green Chemistry, 2018, 20, 1459-1466) describes preparation of a resin comprising glycerol diglycidyl ether and lignin, wherein the lignin is provided in solid form. One problem with the technology described in the article is a long pressing time and high pressing temperature. The 3 plies plywood sample was pressed at 150° C. temperature for 15 minutes to fully cure the resins.

Engelmann G. and Ganster J. (Holzforschung, 2014, 68, 435-446) describes preparation of a biobased epoxy resin with low molecular weight kraft lignin and pyrogallol, wherein the lignin component consists of an acetone extraction from Kraft lignin.

SUMMARY OF THE INVENTION

It has now surprisingly been found that if lignin dispersed in a suitable cross-linker, such as a glycidyl ether, a cross-linking reaction can be catalyzed by a basic solution. This results into a fast curing resin with excellent reactivity, bonding strength and water resistance.

When lignin dispersed in glycidyl ether is mixed with the water and alkali, the lignin becomes dissolved in the basic solution. In addition, the phenolic hydroxyl groups in the lignin structure are deprotonated and free to react with epoxide groups of the glycidyl ether. This catalyzes the reaction and improved the reactivity and performance of the binder. Therefore, it is possible to easily prepare a bonding resin in which the use of formaldehyde can be avoided. The bonding resin according to the present invention speeds up the reaction significantly and hence reduces the pressing time and enables the use of a lower pressing temperature for curing the bonding resin, when manufacturing for example laminates, mineral wool insulation and wood products such as plywood, oriented strandboard (OSB), laminated veneer lumber (LVL), medium density fiberboards (MDF), parquet flooring, curved plywood, veneered particleboards, veneered MDF or particle boards, laminates or mineral wool insulation. The bonding resin is also useful for example in composites, molding compounds, foundry applications and coatings for paper, wood or metal substrates.

The present invention is thus directed to a method for preparing a bonding resin, wherein lignin in solid form or in the form of a dispersion in water is mixed with one or more of glycerol diglycidyl ether, diglycerol polyglycidyl ether, polyglycerol polyglycidyl ether, glycerol triglycidyl ether, sorbitol polyglycidyl ether, alkoxylated glycerol polyglycidyl ether, trimethylolpropane triglycidyl ether, trimethylolpropane diglycidyl ether, polyoxypropylene glycol diglycidylether, polyoxypropylene glycol triglycidyl ether, diglycidylether of cyclohexane dimethanol, resorcinol diglycidyl ether, isosorbide diglycidyl ether, pentaerythritol tetraglycidyl ether, ethylene glycol diglycidyl ether, polyethylene glycol diglycidyl ether having 2-9 ethylene glycol units, propylene glycol diglycidyl ether having 1-5 propylene glycol units, hexahydrophtalic acid diglycidylester and/or diglycidyl ether of terminal diol having a linear carbon chain of 3-6 carbon atoms, a crosslinker selected from diglycidyl-, triglycidyl- or polyglycidyl-ether of a carbohydrate, diglycidyl-, triglycidyl- or polyglycidyl-ester of a carbohydrate, diglycidyl-ether or diglycidyl ester of salicylic acid, vanillic acid, or 4-hydroxybenzoic acid, an epoxidized or glycidyl substituted plant-based phenolic compound (such as tannin, cardanol, cardol, anacardic acid) or epoxidized plant-based oil (such as rapeseed oil, linseed oil, soy bean oil), tris(4-hydroxyphenyl) methane triglycidyl ether, N,N-bis(2,3-epoxypropyl)aniline, p-(2,3-epoxypropoxy-N,N-bis(2,3-epoxypropyl)aniline, diglycidyl ether of bis-hydroxymethylfuran, and a crosslinker having functional groups selected from diglycidyl amide, triglycidyl amide, polyglycidyl amide, diglycidyl ester, triglycidyl ester, polyglycidyl ester, diglycidyl azide, triglycidyl azide, polyglycidyl azide, diglycidyl methacrylate, triglycidyl methacrylate and polyglycidyl methacrylate followed by addition of a basic solution.

One aspect of the present invention is a method for preparing a bonding resin, wherein a lignin in solid form is mixed with one or more cross-linkers and/or one or more glycidyl ethers, wherein the cross-linker has an epoxy index above 4 eq/kg, followed by addition of a basic solution. The epoxy index can be determined according to ISO 3001. Preferably, the cross-linker has an epoxy index above 5 eq/kg. The cross-linker is an aliphatic or, preferably, aromatic glycidyl ether. Preferably, the cross-linker is aliphatic.

The glycidyl ethers may be polyfunctional epoxides and the method according to the present invention may use a mixture of epoxides, such as monofunctional, di-functional, tri-functional and/or tetra-functional.

The present invention is thus also directed to the bonding resin obtainable using the method described above and to the use of the bonding resin in the manufacture of laminates, mineral wool insulation and wood products such as plywood, oriented strandboard (OSB), laminated veneer lumber (LVL), medium density fiberboards (MDF) and particle boards. The bonding resin according to the present invention may also be used in or for coatings, such as coatings applied on metal surfaces or wood or other substrates. The present invention is also directed to such laminates, mineral wool insulation and wood products such as plywood, oriented strandboard (OSB), laminated veneer lumber (LVL), medium density fiberboards (MDF), high density fiberboards (HDF), parquet flooring, curved plywood, veneered particleboards, veneered MDF, laminates or mineral wool insulation manufactured using the bonding resin. The bonding resin according to the present invention may also be used in the manufacture of composites, molding compounds, foundry applications and coatings for paper, wood or metal substrates.

DETAILED DESCRIPTION

It is intended throughout the present description that the expression "lignin" embraces any kind of lignin, e.g. lignin originated from hardwood, softwood or annular plants. Preferably the lignin is an alkaline lignin generated in e.g. the Kraft process. Preferably, the lignin has been purified or isolated before being used in the process according to the present invention. The lignin may be isolated from black liquor and optionally be further purified before being used in the process according to the present invention. The purification is typically such that the purity of the lignin is at least 90%, preferably at least 95%. Thus, the lignin used according to the method of the present invention preferably contains less than 10%, preferably less than 5% impurities. The lignin may then be separated from the black liquor by using the process disclosed in WO2006031175. The lignin may then be separated from the black liquor by using the process referred to as the LignoBoost process.

The particle size of the lignin is preferably such that 50 wt-% of the particles have a particle size larger than 100 micrometers. Preferably, at least 20 wt-% of the particles have a particle size larger than 300 micrometers. Preferably, at least 80 wt-% of the particles have a particle size smaller than 1000 micrometers. Preferably, the moisture content of the particles is less than 40 wt-%.

The glycerol diglycidyl ether, diglycerol polyglycidyl ether, polyglycerol polyglycidyl ether, glycerol triglycidyl ether, sorbitol polyglycidyl ether, alkoxylated glycerol polyglycidyl ether, trimethylolpropane triglycidyl ether, trimethylolpropane diglycidyl ether, polyoxypropylene glycol diglycidylether, polyoxypropylene glycol triglycidyl ether, diglycidylether of cyclohexane dimethanol, resorcinol diglycidyl ether, isosorbide diglycidyl ether, pentaerythritol tetraglycidyl ether, ethylene glycol diglycidyl ether, polyethylene glycol diglycidyl ether having 2-9 ethylene glycol units (preferably 2-5 ethylene glycol units, such as 2-3 or 4-5 ethylene units), propylene glycol diglycidyl ether having 1-3 propylene glycol units or 4-5 propylene glycol units, hexahydrophtalic acid diglycidylester and/or diglycidyl ether of terminal diol having a linear carbon chain of 3-6 carbon atoms used according to the present invention acts as a cross-linker. Glycidyl ethers with more functional epoxide groups can be used such as glycerol diglycidyl ether, glycerol triglycidyl ether and sorbitol polyglycidyl ether. Other glycidyl ethers having two to nine (such as 2 to 4 or 2 to 6) alkylene glycol groups can be used, such as diethylene glycol diglycidyl ether, triethylene glycol diglycidyl ether, dipropylene glycol diglycidyl ether and tripropylene diglycidyl ether. As the chain lengths between two glycidyl ether groups gets longer, the resin becomes more flexible, which may negatively influence its performance. It results in an adhesive during curing. A crosslinker selected from diglycidyl-, triglycidyl- or polyglycidyl-ether of a carbohydrate, diglycidyl-, triglycidyl- or polyglycidyl-ester of a carbohydrate, diglycidyl-ether or diglycidyl ester of salicylic acid, vanillic acid, or 4-hydroxybenzoic acid, an epoxidized or glycidyl substituted plant-based phenolic compound (such as tannin, cardanol, cardol, anacardic acid) or epoxidized plant-based oil (such as rapeseed oil, linseed oil, soy bean oil), tris(4-hydroxyphenyl) methane triglycidyl ether, N,N-bis(2,3-epoxypropyl)aniline, p-(2,3-epoxypropoxy-N,N-bis(2,3-epoxypropyl)aniline, diglycidyl ether of bis-hydroxymethylfuran, and a crosslinker having functional groups selected from diglycidyl amide, triglycidyl amide, polyglycidyl amide, diglycidyl ester, triglycidyl ester, polyglycidyl ester, diglycidyl azide, triglycidyl azide, polyglycidyl azide, diglycidyl methacrylate, triglycidyl methacrylate and polyglycidyl methacrylate can also be used according to the present invention. It results in an adhesive during curing. Typically, the bonding resin according to the present invention is and applied to the surfaces of for example veneers, such as in the manufacture of plywood. When the veneers are pressed together under heating, the cross-linking in the bonding resin takes place, resulting in an adhesive.

The pH of the basic solution is preferably in the range of from 10 to 14. Examples of suitable bases include sodium hydroxide, potassium hydroxide, ammonia or other organic base, and mixtures thereof. In one embodiment, the amount of alkali in the basic solution is preferably from 0.1 wt-% to 15 wt-% of the solution, such as from 0.1 wt-% to 10 wt-% of the solution. In one embodiment, the basic solution is aqueous. The basic solution may comprise additives such as such as urea, tannin, solvents, surfactants, dispersing agents and fillers.

The weight ratio between lignin (dry weight) and the total amount of glycerol diglycidyl ether, diglycerol polyglycidyl ether, polyglycerol polyglycidyl ether, glycerol triglycidyl ether, sorbitol polyglycidyl ether, alkoxylated glycerol polyglycidyl ether, trimethylolpropane triglycidyl ether, trimethylolpropane diglycidyl ether, polyoxypropylene glycol diglycidylether, polyoxypropylene glycol triglycidyl ether, diglycidylether of cyclohexane dimethanol, resorcinol diglycidyl ether, isosorbide diglycidyl ether, pentaerythritol tetraglycidyl ether, ethylene glycol diglycidyl ether, polyethylene glycol diglycidyl ether having 2-9 ethylene glycol units, propylene glycol diglycidyl ether having 1-5 propylene glycol units, hexahydrophtalic acid diglycidylester and/or diglycidyl ether of terminal diol having a linear carbon chain of 3-6 carbon or a crosslinker selected from diglycidyl-, triglycidyl- or polyglycidyl-ether of a carbohydrate, diglycidyl-, triglycidyl- or polyglycidyl-ester of a carbohydrate, diglycidyl-ether or diglycidyl ester of salicylic acid, vanillic acid, or 4-hydroxybenzoic acid, an epoxidized or glycidyl substituted plant-based phenolic compound (such as tannin, cardanol, cardol, anacardic acid) or epoxidized plant-based oil (such as rapeseed oil, linseed oil, soy bean oil), tris(4-hydroxyphenyl) methane triglycidyl ether, N,N-bis(2,3-epoxypropyl)aniline, p-(2,3-epoxypropoxy-N,N-bis (2,3-epoxypropyl)aniline, diglycidyl ether of bis-hydroxymethylfuran, and a crosslinker having functional groups selected from diglycidyl amide, triglycidyl amide, polyglycidyl amide, diglycidyl ester, triglycidyl ester, polyglycidyl ester, diglycidyl azide, triglycidyl azide, polyglycidyl azide, diglycidyl methacrylate, triglycidyl methacrylate and polyglycidyl methacrylate is preferably in the range of from 1:10 to 10:1. The amount of lignin in the bonding resin is preferably from 5 wt-% to 50 wt-%, calculated as the dry weight of lignin and the total weight of the bonding resin.

The bonding resin may also comprise additives, such as urea, tannin, solvents and fillers.

The amount of urea in the bonding resin can be 0-40% preferably 5-20% calculated as the dry weight of urea and the total weight of the bonding resin.

A filler and/or hardener can also be added to the bonding resin. Examples of such fillers and/or hardeners include limestone, cellulose, sodium carbonate, and starch.

The reactivity of the lignin with the glycidyl ether can be increased by modifying the lignin by glyoxylation, etherification, esterification or any other method where lignin hydroxyl content or carboxylic content or amine content or thiol content is increased.

Other solvents that can be used in the bonding resins according to the present invention are glycerol, ethylene glycol, polyethylene glycol, propylene glycol, polypropylene glycol, sorbitol and/or any terminal diol having a linear carbon chain of 3-6 carbon atoms.

The lignin in solid form or in the form of a dispersion in water is preferably mixed with the glycidyl ether at room temperature, such as at a temperature of from 15° C. to 30° C. The mixing is preferably carried out for about 5 minutes to 2 hours. Preferably, the viscosity of the mixture is monitored during mixing, either continuously or by taking samples and determining the viscosity thereof. After addition of basic solution, mixing is preferably carried out for at least 1 minutes, such as from 1 minute to about 2 hours. Preferably, the viscosity of the mixture is monitored also during mixing after the basic solution, either continuously or by taking samples and determining the viscosity thereof. The mixing can also be carried out by providing the glycidyl ether on lignin particles, such as by spraying the glycidyl ether onto lignin particles, optionally followed by drying.

EXAMPLES

The first component is prepared by dispersing 40 g of lignin into 60 g of polyglycerol polyglycidyl ether and 30 g of glycerol. The second component was prepared by mixing 17.4 g of 50% sodium hydroxide solution and 49.8 g of water. Both components were mixed and stirred for 20 minutes using an overhead stirrer at room temperature.

The binder was tested in a lap-joint test using an Automated Bonding Evaluation System (ABES) tensile tester.

For this purpose, relatively thin beech veneers of thickness of 0.6 mm were used that were cut into 105×20 mm pieces. Resin was applied to an area of 5 mm×20 mm on one side of one end section of the two pieces. Resin coated, overlapped end section of a series of specimens were pressed together in a hot press at a pressure of 5 kg/m$^2$ using pressing time of 90 seconds at pressing temperature of 150° C.

Prior to evaluation, all samples were soaked in water for 24 hours at room temperature. Average data from 5 test specimens with and without conditioning is presented in Table 1.

TABLE 1

| | Shear strength using ABES | |
|---|---|---|
| | Shear strength [N/mm$^2$] Dry Strength | Shear strength [N/mm$^2$] Wet Strength |
| Adhesive formulation | 6.5 | 1.25 |

Example 2

The first component was prepared by dispersing 40 g of lignin into 60 g of polyethylene glycol diglycidyl ether. The second component was prepared by mixing 22.6 g of 50% sodium hydroxide solution and 80 g of water. The first and second components were mixed and stirred for 20 minutes using an overhead stirrer at room temperature.

The binder was tested in a lap-joint test using an Automated Bonding Evaluation System (ABES) tensile tester.

For this purpose, relatively thin beech veneers of thickness of 0.6 mm were used that were cut into 105×20 mm pieces. Resin was applied to an area of 5 mm×20 mm on one side of one end section of the two pieces. Resin coated, overlapped end section of a series of specimens were pressed together in a hot press at a pressure of 5 kg/m$^2$ using pressing time of 90 seconds at pressing temperature of 150° C.

Prior to evaluation, all samples were soaked in water for 24 hours at room temperature. Average data from 5 test specimens with and without conditioning is presented in Table 2.

TABLE 2

| Shear strength using ABES | | |
|---|---|---|
| | Shear strength [N/mm$^2$] Dry Strength | Shear strength [N/mm$^2$] Wet Strength |
| Adhesive formulation | 7.3 | 1.1 |

In view of the above detailed description of the present invention, other modifications and variations will become apparent to those skilled in the art. However, it should be apparent that such other modifications and variations may be effected without departing from the spirit and scope of the invention.

The invention claimed is:

1. A method for preparing a bonding resin comprising:
mixing lignin in solid form or in the form of a dispersion in water with:
one or more ethers selected from a group consisting of: glycerol diglycidyl ether, diglycerol polyglycidyl ether, polyglycerol polyglycidyl ether, glycerol triglycidyl ether, sorbitol polyglycidyl ether, alkoxylated glycerol polyglycidyl ether, trimethylolpropane triglycidyl ether, trimethylolpropane diglycidyl ether, polyoxypropylene glycol diglycidylether, polyoxypropylene glycol triglycidyl ether, diglycidylether of cyclohexane dimethanol, resorcinol diglycidyl ether, isosorbide diglycidyl ether, pentaerythritol tetraglycidyl ether, ethylene glycol diglycidyl ether, polyethylene glycol diglycidyl ether having 2-9 ethylene glycol units, propylene glycol diglycidyl ether having 1-5 propylene glycol units, hexahydrophtalic acid diglycidylester and/or diglycidyl ether of terminal diol having a linear carbon chain of 3-6 carbon atoms, or a crosslinker selected from diglycidyl-, triglycidyl-or polyglycidyl-ether of a carbohydrate, diglycidyl-, triglycidyl-or polyglycidyl-ester of a carbohydrate, diglycidyl-ether or diglycidyl ester of salicylic acid, vanillic acid, or 4-hydroxybenzoic acid, an epoxidized or glycidyl substituted plant-based phenolic compound or epoxidized plant-based oil, tris (4-hydroxyphenyl) methane triglycidyl ether, N,N-bis(2,3-epoxypropyl) aniline, p-(2,3-epoxypropoxy-N,N-bis (2,3-epoxypropyl) aniline, diglycidyl ether of bis-hydroxymethylfuran, and a compound having functional groups selected from diglycidyl amide, triglycidyl amide, polyglycidyl amide, diglycidyl ester, triglycidyl ester, polyglycidyl ester, diglycidyl azide, triglycidyl azide, polyglycidyl azide, diglycidyl methacrylate, triglycidyl methacrylate and polyglycidyl methacrylate, wherein the lignin has not been chemically modified, and,
addition of a basic solution after the mixing, the basic solution having a pH in a range of from 10 to 14.

2. The method according to claim 1, wherein the lignin is in solid form and is mixed with one or more ethers selected from a group consisting of: glycerol diglycidyl ether, diglycerol polyglycidyl ether, polyglycerol polyglycidyl ether, glycerol triglycidyl ether, sorbitol polyglycidyl ether, alkoxylated glycerol polyglycidyl ether, trimethylolpropane triglycidyl ether, trimethylolpropane diglycidyl ether, polyoxypropylene glycol diglycidylether, polyoxypropylene glycol triglycidyl ether, diglycidylether of cyclohexane dimethanol, resorcinol diglycidyl ether, isosorbide diglycidyl ether, pentaerythritol tetraglycidyl ether, ethylene glycol diglycidyl ether, polyethylene glycol diglycidyl ether having 2-9 ethylene glycol units, propylene glycol diglycidyl ether having 1-5 propylene glycol units, hexahydrophtalic acid diglycidylester and/or diglycidyl ether of terminal diol having a linear carbon chain of 3-6 carbon atoms.

3. The method according to claim 1, wherein the ether comprises polyglycerol polyglycidyl ether.

4. The method according to claim 1, wherein the lignin is further mixed with an additive, and wherein the additive comprises a solvent.

5. The method according to claim 1, wherein a weight ratio between the lignin, calculated on a basis of dry lignin, and a total amount of glycerol diglycidyl ether, or ethylene glycol diglycidyl ether, or both is from 1:10 to 10:1.

6. The method according to claim 1, wherein the lignin is further mixed with an additive, and wherein the additive is selected from a group consisting of: urea, tannin, a surfactant, a dispersing agent, a filler, and a solvent.

7. The method according to claim 6, wherein the additive is a solvent comprising glycerol, ethylene glycol, polyethylene glycol, propylene glycol, polypropylene glycol, sorbitol, any terminal diol having a linear carbon chain of 3-6 carbon atoms, or combinations thereof.

8. The method according to claim 1, wherein the lignin is further mixed with an additive.

9. A method for preparing a bonding resin comprising:
mixing lignin in solid form or in the form of a dispersion in water with one or more ethers selected from a group consisting of: glycerol diglycidyl ether, diglycerol polyglycidyl ether, polyglycerol polyglycidyl ether, glycerol triglycidyl ether, sorbitol polyglycidyl ether, alkoxylated glycerol polyglycidyl ether, trimethylolpropane triglycidyl ether, trimethylolpropane diglycidyl ether, polyoxypropylene glycol diglycidylether, polyoxypropylene glycol triglycidyl ether, diglycidylether of cyclohexane dimethanol, resorcinol diglycidyl ether, isosorbide diglycidyl ether, pentaerythritol tetraglycidyl ether, ethylene glycol diglycidyl ether, polyethylene glycol diglycidyl ether having 2-9 ethylene glycol units, propylene glycol diglycidyl ether having 1-5 propylene glycol units, hexahydrophtalic acid diglycidylester and/or diglycidyl ether of terminal diol having a linear carbon chain of 3-6 carbon atoms,
wherein the lignin is modified by any method where lignin hydroxyl content or amine content or thiol content is increased and,
addition of a basic solution after the mixing, the basic solution having a pH in a range of from 10 to 14.

* * * * *